US008437906B2

(12) United States Patent
Yukawa et al.

(10) Patent No.: US 8,437,906 B2
(45) Date of Patent: May 7, 2013

(54) SYSTEM AND METHOD FOR GENERATING MAINTENANCE RELEASE INFORMATION

(75) Inventors: Steven J. Yukawa, Seattle, WA (US); Rajit Jain, Seattle, WA (US); Tim W. Anstey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1420 days.

(21) Appl. No.: 12/104,600

(22) Filed: Apr. 17, 2008

(65) Prior Publication Data

US 2009/0265357 A1 Oct. 22, 2009

(51) Int. Cl.

| | |
|---|---|
| ***G01M 17/00*** | (2006.01) |
| ***G06F 17/00*** | (2006.01) |
| ***G06F 19/00*** | (2006.01) |
| ***G06F 19/24*** | (2011.01) |
| ***G06Q 10/00*** | (2006.01) |
| ***G08B 21/00*** | (2006.01) |
| ***G08B 31/00*** | (2006.01) |

(52) U.S. Cl.
USPC .................. 701/29.1; 707/603; 707/999.201; 340/945; 705/7.23; 701/29.4; 701/31.4; 701/33.4

(58) Field of Classification Search .................. 701/1, 3, 701/14, 29, 30, 32, 35, 29.1, 29.2, 29.3, 29.4, 701/29.6, 29.7, 30.3, 31.4, 31.5, 31.6, 31.7, 701/31.8, 31.9, 32.1, 32.7, 32.8, 33.2, 33.3, 701/33.4, 33.5, 34.2, 34.4; 340/945, 438, 340/439, 971, 425.5, 500; 705/1.1, 7.22, 705/7.23; 715/700; 244/75.1, 76 R; 707/999.001, 707/999.009, 999.01, 999.107, 999.201, 707/600, 601, 602, 603
See application file for complete search history.

(56) References Cited

U.S. PATENT DOCUMENTS

| | | | |
|---|---|---|---|
| 2,575,757 | A | 11/1951 | Hardy |
| 2,612,606 | A | 9/1952 | Wehner |
| 2,755,216 | A | 7/1956 | Lemons |
| 2,873,931 | A | 2/1959 | Fleischmann |
| 3,002,190 | A | 9/1961 | Oleesky et al. |
| 3,463,418 | A | 8/1969 | Miksch |
| 3,604,661 | A | 9/1971 | Mayer, Jr. |
| 4,189,120 | A | 2/1980 | Wang |
| 4,318,328 | A | 3/1982 | Rona |
| 4,365,574 | A | 12/1982 | Norminton |
| 4,458,936 | A | 7/1984 | Mulholland |
| 4,661,821 | A | 4/1987 | Smith |
| 4,867,394 | A | 9/1989 | Patterson, Jr. |

(Continued)

OTHER PUBLICATIONS

Appendix III—4 and 5 Digit Sections, http://web.archive.org/web/20020621082045/http://pdas.com/sections45.htm, dated May 24, 2006, pp. 1-18.

(Continued)

*Primary Examiner* — Thomas Tarcza
*Assistant Examiner* — Edward Pipala
(74) *Attorney, Agent, or Firm* — Harness, Dickey & Pierce, P.L.C.

(57) ABSTRACT

A method for creating a maintenance release (MR) record containing operational status information for a mobile platform. The method may involve electronically accessing a database to acquire operational items relating to operational worthiness of the mobile platform, displaying the selected operational items to the user; and performing a synchronization check of the database system. The synchronization check verifies that the selected operational items represent the most recently stored information in the database system.

20 Claims, 3 Drawing Sheets

U.S. PATENT DOCUMENTS 4,878,062 A 10/1989 Craven et al.
5,093,313 A 3/1992 Minovitch
5,209,434 A 5/1993 Lo Presti et al.
5,216,435 A 6/1993 Hirata et al.
D344,489 S 2/1994 Webb
5,458,299 A 10/1995 Collins et al.
5,689,276 A 11/1997 Uematsu et al.
5,692,709 A 12/1997 Mihora et al.
5,805,111 A 9/1998 Brettner et al.
5,986,611 A 11/1999 Harrison et al.
D432,073 S 10/2000 Coyle
6,204,820 B1 3/2001 Jensen, Jr.
6,262,720 B1 * 7/2001 Jeffrey et al. ................. 715/710
6,570,540 B2 5/2003 Desargant et al.
6,608,596 B2 8/2003 Bien et al.
6,751,442 B1 6/2004 Barrett
D497,586 S 10/2004 Ferguson
6,814,474 B2 11/2004 Groeller
6,831,610 B2 12/2004 Quagliaro
6,844,855 B2 1/2005 Carson
6,844,856 B1 1/2005 Wright
6,856,295 B2 2/2005 Desargant et al.
6,959,236 B2 * 10/2005 Betters et al. ................... 701/35
6,992,640 B2 1/2006 Usami et al.
7,050,894 B2 * 5/2006 Halm et al. ..................... 701/33
7,123,199 B2 10/2006 Rotta
7,359,777 B2 * 4/2008 Betters et al. ................... 701/35
2002/0143443 A1 * 10/2002 Betters et al. ................... 701/29
2003/0083794 A1 * 5/2003 Halm et al. ..................... 701/29
2003/0131011 A1 * 7/2003 Haunschild et al. .......... 707/100
2004/0139053 A1 * 7/2004 Haunschild ....................... 707/1
2004/0162651 A1 * 8/2004 Halm et al. ..................... 701/29
2004/0204805 A1 * 10/2004 Betters et al. ................... 701/35
2006/0047378 A1 * 3/2006 Betters et al. ..................... 701/3
2007/0219676 A1 * 9/2007 Allen et al. ....................... 701/3
2008/0177439 A1 * 7/2008 Betters et al. ................... 701/35
2009/0276276 A1 * 11/2009 Black et al. ....................... 705/8

OTHER PUBLICATIONS

Airfoil Geometry, http://web.archive.org/web/19991103040416/http://www.desktopaero.com/appliedaero/airfoils1/airfoilgeometry.html, dated May 4, 2006, pp. 1-2.

Lednicer, David "The Incomplete Guide to Airfoil Usage," Apr. 5, 2005, http://www.ae.uiuc.Edu/m-selig/ads/aircraft.html, pp. 1-109.

* cited by examiner

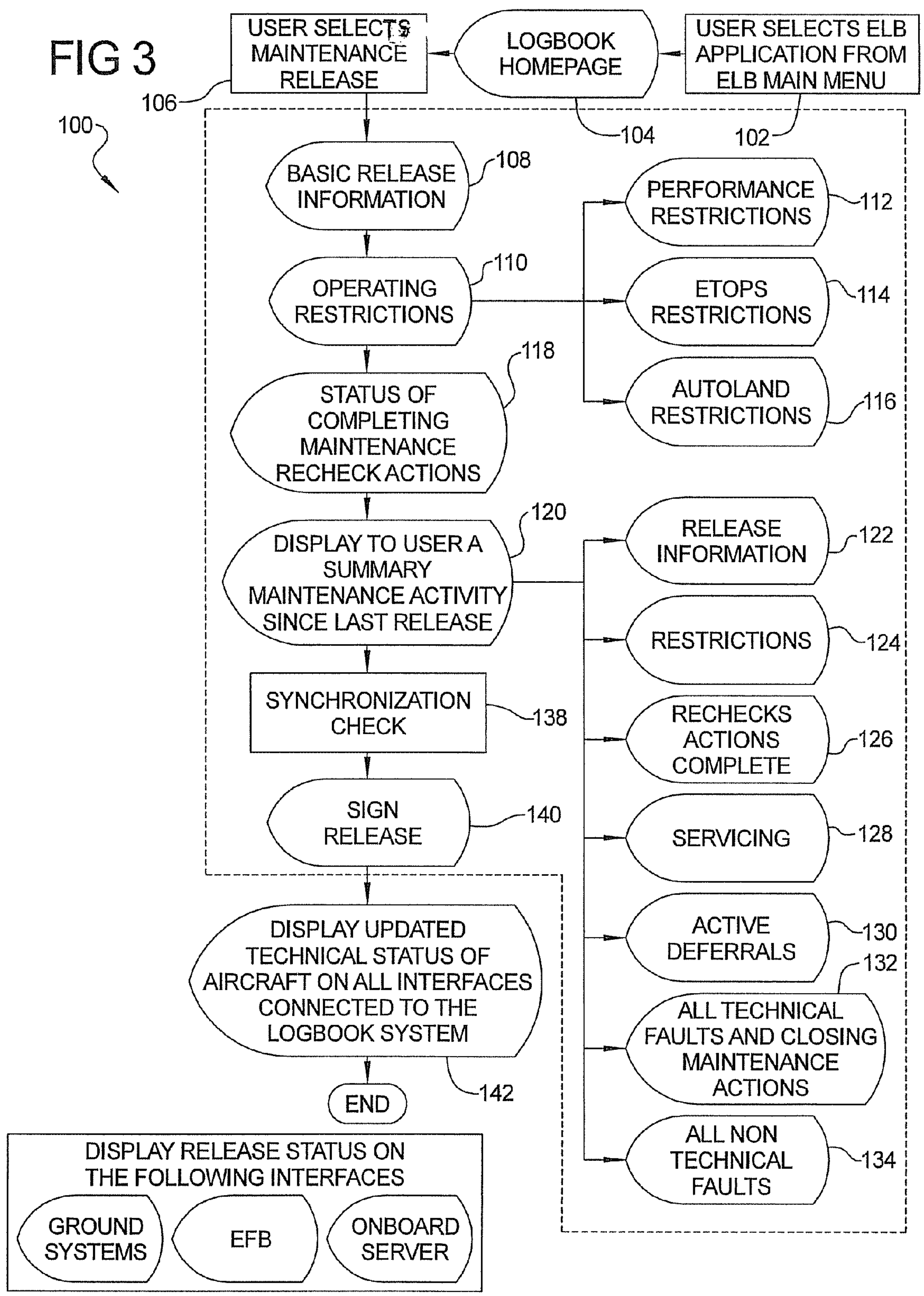
FIG 3
100
USER SELECTS MAINTENANCE RELEASE
106
LOGBOOK HOMEPAGE
104
USER SELECTS ELB APPLICATION FROM ELB MAIN MENU
102
BASIC RELEASE INFORMATION
108
OPERATING RESTRICTIONS
110
PERFORMANCE RESTRICTIONS
112
ETOPS RESTRICTIONS
114
AUTOLAND RESTRICTIONS
116
STATUS OF COMPLETING MAINTENANCE RECHECK ACTIONS
118
DISPLAY TO USER A SUMMARY MAINTENANCE ACTIVITY SINCE LAST RELEASE
120
RELEASE INFORMATION
122
RESTRICTIONS
124
RECHECKS ACTIONS COMPLETE
126
SERVICING
128
ACTIVE DEFERRALS
130
ALL TECHNICAL FAULTS AND CLOSING MAINTENANCE ACTIONS
132
ALL NON TECHNICAL FAULTS
134
SYNCHRONIZATION CHECK
138
SIGN RELEASE
140
DISPLAY UPDATED TECHNICAL STATUS OF AIRCRAFT ON ALL INTERFACES CONNECTED TO THE LOGBOOK SYSTEM
142
END
DISPLAY RELEASE STATUS ON THE FOLLOWING INTERFACES
GROUND SYSTEMS
EFB
ONBOARD SERVER

SYSTEM AND METHOD FOR GENERATING MAINTENANCE RELEASE INFORMATION

FIELD

The present disclosure relates to systems and methods involving the creation and presentation of operational worthiness information for mobile platforms, and more particularly to a system and method for acquiring and presenting operational worthiness information from one or more electronic databases or devices for evaluation by an individual prior to operation of the mobile platform.

BACKGROUND

The statements in this section merely provide background information related to the present disclosure and may not constitute prior art.

The Maintenance Release (MR) is an important step in the operational cycle of aircraft flights and intervening maintenance periods on the ground. The MR documents the airworthiness status of the aircraft and identifies any restrictions that the flight crew operating the aircraft must adhere to. The MR is also a legal statement (defined by aviation regulatory agencies) with restrictions on whom and under what conditions a MR can be created or issued. Typically only a licensed aviation mechanic is allowed to document a MR and at the time of release any aircraft defects must either be corrected or deferred according to the rules governed by the "Minimum Equipment List" or other approved aviation procedures.

Assessment of airworthiness status today is typically left up to the releasing line mechanic who will be reviewing paper logbook systems in an attempt to completely assess various items that must be considered and documented prior to releasing the aircraft to the flight crew of the aircraft. Such items may include the status of any open defect reports, for example, are they closed or deferred, for defects related to the airworthiness of the aircraft only (i.e., not cabin & passenger service related defects). The releasing line mechanic will also be reviewing the expiration status of any previously entered deferrals, whether they are operational time or cycle limited and/or calendar day based expiration deferrals. The releasing line mechanic will also be reviewing the operational restrictions associated with any active deferrals, and the completion status of any service checks required for the upcoming flight mission.

The continuous monitoring of the technical status of an aircraft is typically left to ground based maintenance history & planning systems. However, these systems may not always receive timely inputs from aircraft logbook systems, which are often paper based, to accurately reflect the operational defects, corrective actions and/or deferrals that need to be fully considered during the maintenance release process.

Human assessment of the airworthiness status of aircraft also can be a time consuming review process when paper-based logbook systems must be reviewed. Nevertheless, such detailed information concerning all maintenance, fault and operational restrictions on the aircraft needs to be fully considered by an individual responsible for creating the MR record.

SUMMARY

In one aspect the present disclosure relates to a method for creating a maintenance release (MR) record containing operational status information for a mobile platform. The method may comprise:

allowing a user to specify a quantity of release information pertaining to operating information concerning the mobile platform;

electronically accessing a database to acquire selected operational items relating to relating to operational worthiness of the mobile platform;

displaying the selected operational items to the user; and performing a synchronization check of the database system to verify that the selected operational items represent the most recently stored information in the database system.

In another aspect a method for creating a maintenance release (MR) record containing status information for an aircraft is disclosed. The method may include:

providing a feature for a user to provide a first quantity of release information pertaining to operating information concerning the aircraft;

electronically accessing a first database located on-board the aircraft to acquire a first quantity of operational items;

wirelessly electronically accessing a second database located remote from the aircraft to acquire a second quantity of operational items, said first and second quantities of operational items including at least a plurality of:

- open maintenance items;
- expired deferrals for maintenance items that relate to aircraft airworthiness;
- active deferrals for maintenance items; and
- operating restrictions for said aircraft;

displaying said selected operational items to said user; and performing a synchronization check of said database to verify that said selected operational items represent most recently stored information in said database.

In another aspect a system is disclosed for creating a maintenance release (MR) record containing status information for a mobile platform. The system may include:

a user input for a first quantity of release information pertaining to operating information concerning said mobile platform;

an electronically accessible database for storing operational items relating to at least one of;

- open faults; and
- deferrals for operational items that relate to mobile platform operational worthiness;

a display for displaying said selected operational items to said user; and a server having a software module that performs a synchronization check of said database to verify that said selected operational items represent most recently stored information in said database.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a more detailed flowchart of operations performed by the logbook application of FIG. 1.

DETAILED DESCRIPTION

The following description is merely exemplary in nature and is not intended to limit the present disclosure, application, or uses.

Figure 1:
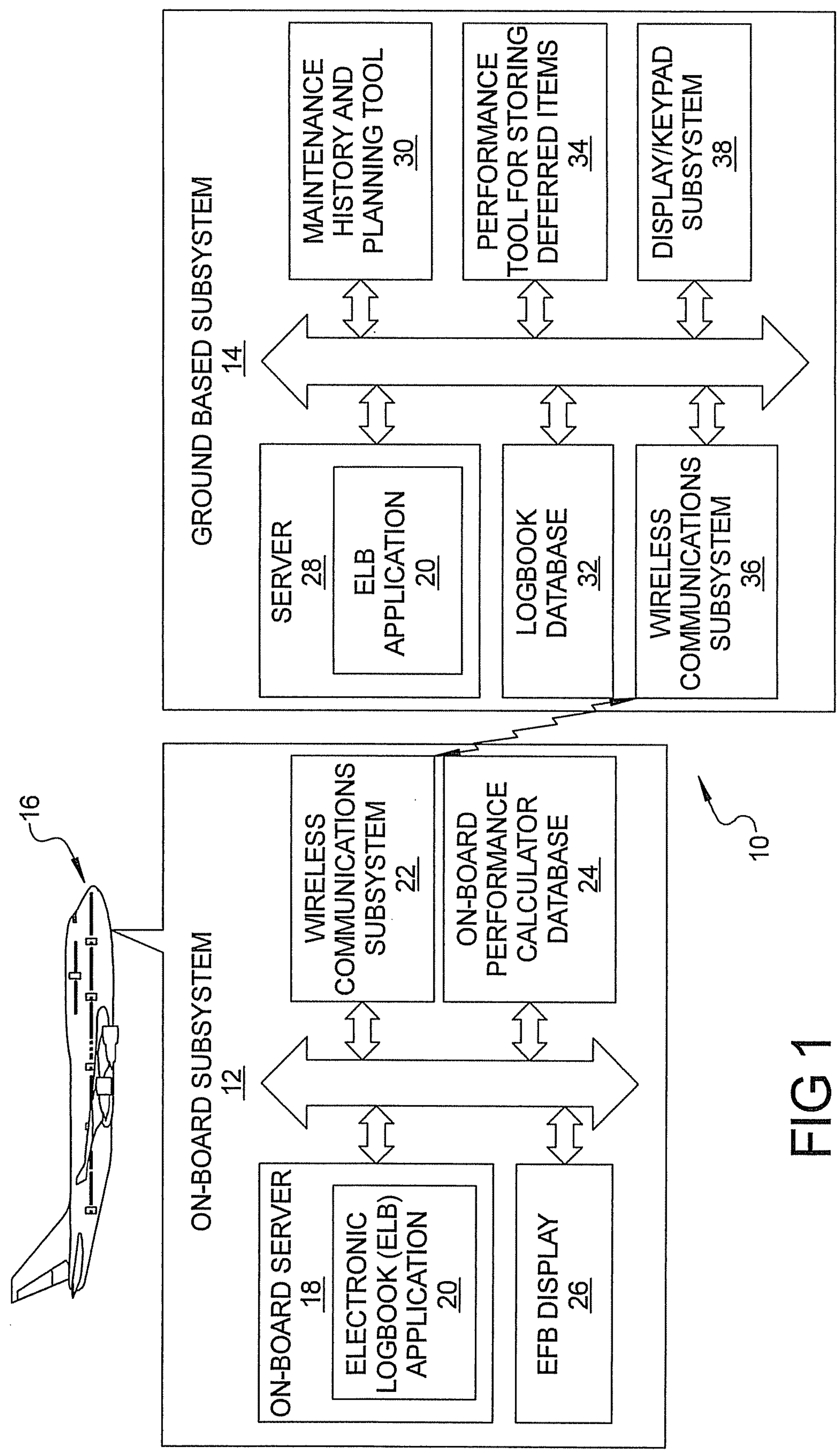
FIG. 1 is a block diagram of one embodiment of a system in accordance with the present disclosure.

Referring to FIG. 1, there is shown one embodiment of a system 10 in accordance with the present disclosure. The system 10 generally may include an on-board subsystem 12 carried on-board a mobile platform 16, and a remote, ground based subsystem 14. In this example, the mobile platform is shown as an aircraft, and will be referenced throughout the following discussion as "aircraft 16". However, it will be appreciated that the system 10 could just as readily be implemented with any other form of mobile platform such as a bus, train or other form of land vehicle, or a boat, ship or other form of a marine vessel. Essentially, the system 10 may be used with any mobile platform that requires predefined operational worthiness checks to be performed before it is operated. Also, it will be appreciated that while the on-board system 12 is illustrated as being on the aircraft 16, that the system 12 could just as readily be located off-board the aircraft 16.

The on-board system 12 may be in wireless communication with a central subsystem, for example a ground based subsystem 14. Typically, when the system 10 is implemented in connection with a commercial aircraft, the ground based subsystem 14 will be operated by the airline that is operating the aircraft 16. The on-board subsystem 12 may include an on-board server 18 running an electronic logbook (ELB) software application 20. The on-board server 18 may be in communication with a wireless communications subsystem 22, an on-board performance calculator database 24 and a display system 26. The display 26 is illustrated as being the display of an Electronic Flight Bag (EFB), but the display 26 could just as readily be implemented as a stand-alone display. The EFB is disclosed in co-pending U.S. patent applications "Multi-Network Aircraft Communication Systems and Methods" (Communication Management), U.S. application Ser. No. 11/303,647, Filed 16 Dec. 2005; "Security Certificate Management", U.S. application Ser. No. 11/191,622, Filed 28 Jul. 2005; and "Automated Integration of Fault Reporting" (ELB Synchronization), application Ser. No. 11/191,645, Filed 28 Jul. 2005, all of which are owned by The Boeing Company, and all of which are hereby incorporated by reference into the present application.

The ground based subsystem 14 may include a server 28 that also runs the ELB application 20. The server 28 may be in communication with a maintenance history and planning tool 30. The maintenance history and planning tool 30 may be an airline's system to manage maintenance history records of an aircraft. The planning tool 30 may also assist airline operators in scheduling planned maintenance activities such as A-checks (routine checks and maintenance such as fluid changes) and D-checks (heavy checks that may last 2-3 months). The server 28 is also in communication with a logbook database 32 and a performance tool for storing deferred items 34. The logbook database 32 may contain an aircraft's records, including a record of flights performed, aircraft defects, maintenance actions taken to address the defects, aircraft servicing records and maintenance release records. The performance tool 34 may use a database (not shown) to indicate inoperative items (deferred defects) which have an impact on takeoff and/or landing performance calculations. A wireless communications subsystem 36 enables the ground based subsystem 14 to communicate with the onboard system 12 on the aircraft 16. The wireless communications subsystem 36 may be an electromagnetic wave transceiver having bidirectional communications capability. A display/keypad subsystem 38 forms a feature that enables an individual, for example a line release mechanic, to input maintenance or fault information to the system 10 (on-board or via the ground) or alternatively to view displayed airworthiness information during creation of the MR record. An LCD or CRT display, or any suitable display may be used for this purpose. Either a touchscreen or an independent keyboard/keypad may be utilized to enable an individual to input the maintenance and/or fault information to the system 10.

The ELB application 20 enables the performance calculator database 24 onboard the aircraft 16, the logbook database 32 and the maintenance history and planning tool 30 on the ground based system 14 all to be electronically accessed and pertinent airworthiness information entered in each subsystem be communicated with the other subsystems. This ensures that the most current (i.e., up-to-date) airworthiness information that needs to be considered when creating a maintenance release (MR) record is considered by the releasing line mechanic (or other individual) who is responsible for creating the MR record. Since no paper reports or paper-based logbooks are required by the system 10, the chance of the releasing line mechanic being provided with less than current information is substantially reduced or entirely eliminated. Since the onboard subsystem 12 and ground based subsystem 14 may be in continuous wireless communications, this means that the logbook databases 20 on each subsystem 12 and 14, as well as the maintenance history and planning tool 30, may be updated essentially instantaneously whenever any of the foregoing subsystems receives new airworthiness information. Thus, each logbook database 20, the maintenance history and planning tool 30 and any other subsystem containing airworthiness information will always have the most current and up-to-date airworthiness information available for review.

It will be appreciated that by "airworthiness" information, it is meant any information that may be important to understanding the maintenance items affecting the aircraft 20, the status of any open faults that may affect the aircraft, as well as any operating restrictions affecting flight or operation of the aircraft 20. Typically, airworthiness information may involve:

- performance restrictions (i.e. flight limited to particular altitude or below)
- Extended Operations/Long Range Operations (ETOPS/LROPS) restrictions (e.g., aircraft must fly within 120 minutes of a suitable landing airport);
- Autoland restrictions (i.e. Autoland restricted to CAT II operations only)
- all active deferrals (maintenance items not requiring immediate attention);
- all expired deferrals (maintenance items covered by a deferral whose predetermined time period has expired);
- all open maintenance items such as all technical faults and all non-technical faults (i.e., items needing further action before an MR record can be created);
- all recheck actions (active deferrals requiring a re-check before the MR record can be created);
- all closing maintenance actions (i.e. repairs made to address a technical or non technical fault, for example replacing a line replaceable unit (LRU));

all servicing actions (e.g., adding engine oil, APU oil; required maintenance checks, that is ETOPS/LROPS, arrival and departure))

Figure 2:
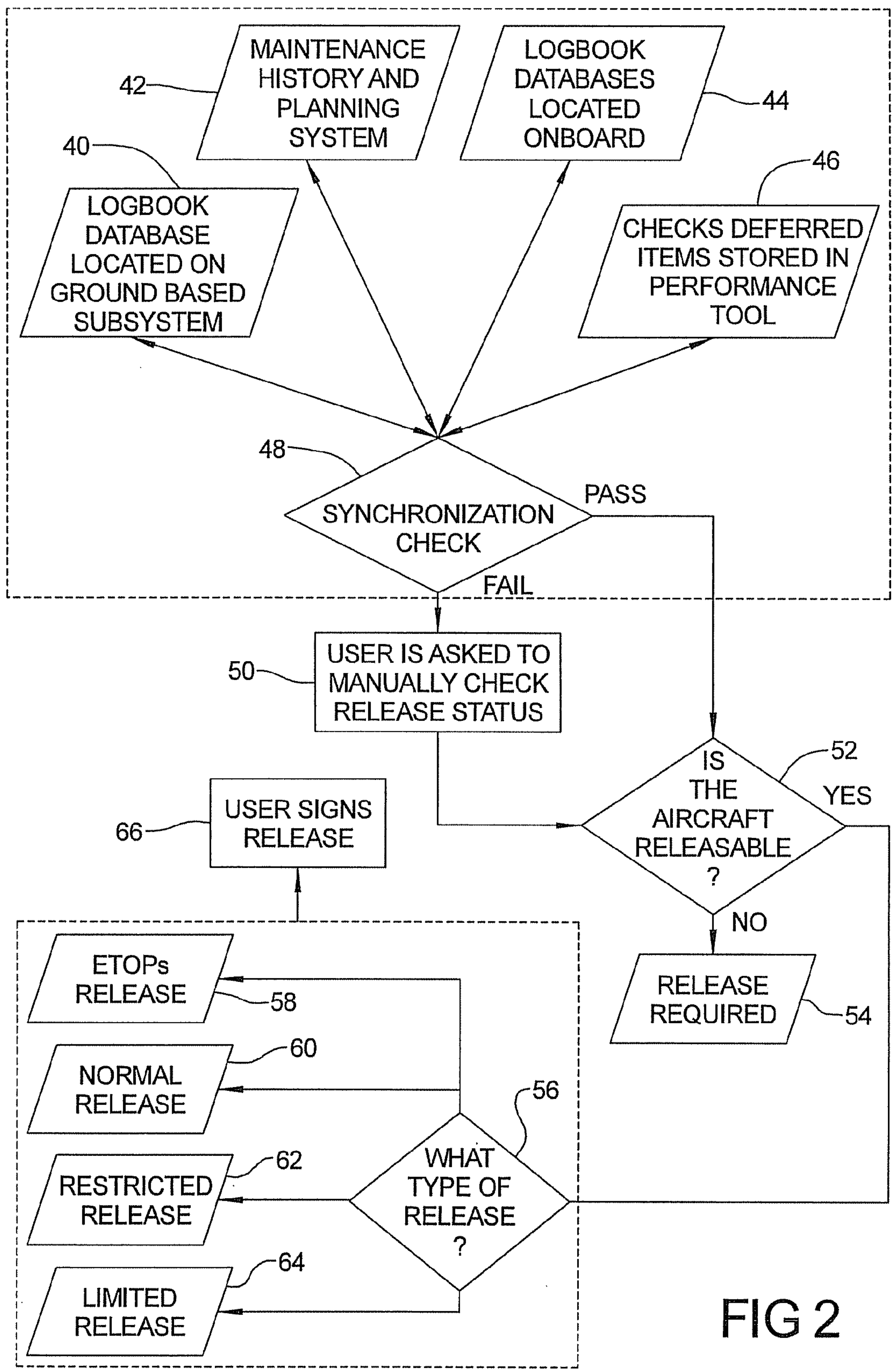
FIG. 2 is a flowchart of major operations performed by the logbook application of FIG. 1.

Referring to FIG. 2, a high level flow diagram is illustrated of major operations that the ELB application 20 of the system 10 may perform. Initially the logbook database 32 located on the ground based subsystem 14, the maintenance history and planning tool 30, the on-board performance calculator database 24 and the performance tool for storing deferred items 34 are all accessed at operations 40, 42, 44 and 46, respectively, and then checked during a synchronization check operation 48. The synchronization check operation 48 is used to verify that the most current airworthiness information has been obtained from each of the various subsystems 24, 30, 32 and 34. This ensures that the responsible airline employee reviewing the data has the most up-to-date information from each of the subsystems 24, 30, 32 and 34. The synchronization check operation may be implemented via a suitable software subroutine in the ELB application 20 that checks the available databases and other sources of information where airworthiness information is being obtained to make sure that the most up-to-date information is being supplied to the user. This check may also be performed at preset time intervals, for example every few minutes or every hour, to make sure that the most up-to-date information is being provided to the user. It will also be appreciated that the synchronization check feature is fully configurable by the airline that is operating the aircraft 16 to electronically check any number of available databases or subsystems where pertinent airworthiness information may be available and obtainable.

If the synchronization check operation 48 does not complete successfully, then a user is asked via a message to manually check the release status, as indicated at operation 50. This message may be presented via the display/keypad subsystem 38. This may involve the line mechanic at the aircraft contacting (e.g., calling) an operations control person to manually verify the logbook status. The ELB application 20 then makes an inquiry at operation 52 to see if the aircraft is releasable, meaning that a valid MR record can be created for it. The release rules are fully configurable by the airline and may include a rule for determining the existence of technical open faults; a rule for determining if servicing is required; a rule for determining if open non-technical items; and a rule for deciding if a Maintenance Release is valid for multiple flights. The rule for deciding if a Maintenance Release is valid for multiple flights may involve a rule that evaluates the past maintenance activity to determine if a past release is still valid. It may also evaluate the current Maintenance Release and determine if a time limit for the Maintenance Release has expired.

If the check at operation 52 produces a "No" answer, then a MR is still required, as indicated at operation 54. This message may also be provided via the display/keypad subsystem 38. The release rules used at operation 52 are also configurable by the airline. These release rules may involve one or more of: a rule for the existence of technical Open Faults; a rule for servicing required; a rule for open non-technical items; and/or a rule for the MR being valid for multiple flights or period of time. The rule for multiple flights may be a rule that evaluates the past maintenance activity to determine if a past MR is still valid. The rule for multiple flights may also evaluate the current MR and determine if a predetermined time limit (e.g. 24 hours, 72 hours) for the MR is still valid.

If the synchronization check operation 48 completes successfully, then operation 52 is performed to see if the aircraft is releasable. If so, then a check is made at operation 56 to determine the exact type of MR that exists for the aircraft 16. At operations 58, 60, 62 and 64, examples of different types of releases that may be displayed are: an "ETOPS/LROPS Release"; a "Normal Release"; a "Restricted Release" and a "Limited Release". The "Normal Release" is a standard type of release where the aircraft 16 is released with no operating restrictions or no open faults. The "Restricted Release" is where the aircraft is released with certain operating restrictions. A "Limited Release" is where the aircraft is released with open faults. An "ETOPS/LROPS" release is where the aircraft is released with authority to fly an ETOPS/LROPS mission as defined by airline procedures and approval from an applicable regulatory authority. At operation 66 the user may sign the MR.

Referring now to FIG. 3, a more detailed flowchart 100 of major operations that may be performed by the logbook application 20 of the system 10 is shown. At operation 102 the user may select the ELB application 20 from the EFB main menu displayed on the display/keypad subsystem 38, as indicated at operation 102. This brings up the ELB application home page on the display/keypad subsystem 38, as indicated at operation 104. The user may then select "Maintenance Release" at operation 106. A screen may then be brought up on the display/keypad subsystem 38 at operation 108 where the user can input various release information. Such release information may include a release station that the user is at, release comments, release data and any other basic release information that would be important for the ELB application 20 to have.

At operation 110, the ELB application 20 aggregates all operating restrictions for the aircraft 16 from active deferrals such as performance restrictions 112, ETOPS/LROPS restrictions 114 and Autoland restrictions 116. At operation 118, a status of the completion of maintenance recheck actions is displayed to the user. At operation 120, a summary of all maintenance data is presented to the user via the display/keypad subsystem 38. This maintenance data may involve all maintenance activity since the last MR was created, or all maintenance activity performed at the particular station at which the user is using the system 10. The summary of maintenance activity since the last MR may involve the display of the following information: a summary of release information including date/time and location of release at operation 122; operating restrictions on the aircraft at operation 124; whether maintenance recheck actions are complete at operation 126; servicing information for the aircraft 20 at operation 128; active deferrals for the aircraft 130; all technical faults and Closing Maintenance actions at operation 132; and all non-technical faults 134.

At operation 136 the synchronization check operation is performed to check all other databases or devices connected to or in communication with the server 28 of the ground based subsystem 14, for any synchronized data. At operation 138 the logbook application 20 sends the MR to all other subsystems or devices within the system 10 or outside the system that may be in communication with the system 10. At operation 140, an updated technical status of the aircraft 16 may be displayed on all interfaces in communication with the ELB application 20. This involves displaying the MR status on such subsystems as the display/keypad subsystem 38, the EFB display 26 and any display device where such information would be useful to view. It will also be appreciated that including non-technical faults in the MR record is configurable, as are creating a new MR for every flight and displaying the status of maintenance recheck actions at operation 118.

An important benefit of the ELB application 20 is that it is configurable to meet the needs and preferences of an airline, as far as what maintenance items, fault items and restrictions are to be checked and presented during the process of creating the MR record. For example, the logbook application 20 may be configured to require that a new MR record be created for every flight.

The system 10 thus enables the most up-to-date maintenance, fault and restriction information to be electronically acquired and presented to the user in an organized fashion. Virtually any number of databases or devices may be checked by the system and all pertinent airworthiness information obtained for consideration by a user charged with evaluating such information to create a MR record. The synchronization feature of the system 10 enables the various databases to be checked for the most up-to-date information when collecting airworthiness information for consideration by the user. This also facilitates real time (i.e., essentially instantaneous) updating of the various databases and devices that the system 10 is in communication with. The elimination of paper reports and paper-based logbooks virtually eliminates the possibility of outdated airworthiness information being considered by an individual charged with creating an MR record.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for creating a maintenance release (MR) record containing operational status information for a mobile platform, the method comprising: using a processor to run an electronic log book (ELB) system located on-board the mobile platform to electronically access a first database of a database system, the first database being located on-board the mobile platform, and also to access at least one second database of the database system, where the at least one second database is located remote from the mobile platform, to acquire operational items relating to operational worthiness of the mobile platform;

using a display system to display the acquired operational items to the user; and using the processor of the ELB system to perform performing a synchronization check of the database system to verify that the acquired operational items from both of the first database and the at least one second database represent the most recently stored information in the database system.

2. The method of claim 1, further comprising providing a feature to enable a user to specify a quantity of release information pertaining to operating information concerning the mobile platform.

3. The method of claim 1, wherein electronically assessing a database system to acquire operational items relating to operational worthiness of the mobile platform comprises acquiring at least one of:

open maintenance items; and active and expired deferrals for operational items that relate to mobile platform operational worthiness.

4. The method of claim 1, wherein creating a MR record for said mobile platform comprises creating a MR record pertaining to an airworthiness of an aircraft.

5. The method of claim 1, wherein the mobile platform comprises an aircraft, and wherein electronically accessing the second database includes obtaining an additional quantity of operational items for consideration by said user that includes at least one of:

restrictions on operation of the aircraft; information on whether re-check maintenance items are complete;

information pertaining to servicing of said aircraft;

information pertaining to active maintenance deferrals of maintenance items pertaining to said aircraft;

information pertaining to technical faults of equipment being carried by said aircraft; and information pertaining to maintenance closing actions.

6. The method of claim 5, wherein obtaining restrictions on operating said aircraft comprises obtaining at least one of: performance restrictions; ETOPS/LROPS (Extended Operations/Long Range Operations) restrictions; and Autoland restrictions.

7. The method of claim 1, wherein accessing the second database includes electronically accessing a maintenance and history planning database and obtaining information therefrom to present to said user for consideration as part of said MR record.

8. The method of claim 7, further comprising displaying said MR record on a display with a request that said MR record be accepted by a maintenance individual.

9. A method for creating a maintenance release (MR) record containing status information for an aircraft, the method comprising:

providing a feature for a user to provide a first quantity of release information pertaining to operating information concerning said aircraft;

using a processor to run an electronic log book (ELB) application to electronically access a first database located on-board the aircraft, to select a first quantity of operational items;

using the ELB application to wirelessly electronically access a second database located remote from the aircraft to select a second quantity of operational items, said selected first and second quantities of operational items including at least a plurality of:

open maintenance items;

expired deferrals for maintenance items that relate to aircraft airworthiness;

active deferrals for maintenance items; and operating restrictions for said aircraft;

displaying said selected operational items to said user; and performing a synchronization check of said first and second databases to verify that said selected first and second quantities of operational items represent most recently stored information in said database.

10. The method of claim 9, wherein acquiring said first and second quantities of operational items further includes acquiring a status of maintenance recheck actions, acquiring service logs and acquiring maintenance actions.

11. The method of claim 9, wherein said MR record comprises one of: an ETOPS/LROPS (Extended Operations/Long Range Operations) release; a Normal Release; a Restricted Release; and a Limited Release.

12. The method of claim 9, further comprising electronically checking a maintenance history and planning system database located remote from said aircraft.

13. The method of claim 9, further comprising displaying said MR record on a display with a request that said MR record be accepted by said user.

14. The method of claim 9, further electronically accessing the second database located remote from said aircraft and obtaining an additional quantity of operational items for consideration by said user that includes at least one of:

information on whether re-check maintenance items are complete;

information pertaining to servicing of said aircraft;

information pertaining to technical and non technical faults of equipment being carried by said aircraft; and information pertaining to maintenance closing actions.

15. The method of claim 9, further comprising obtaining operating restrictions, and wherein said operating restrictions comprise at least one of:

performance restrictions; and

ETOPS/LROPS (Extended Operations/Long Range Operations) restrictions; and

Autoland restrictions.

16. The method of claim 9, further comprising displaying to said user a summary of maintenance activity performed on said aircraft since a most previously created MR record was generated.

17. The method of claim 9, further comprising displaying a status of said MR record on a display carried onboard said aircraft and on a display at a remotely located ground station in wireless communication with said aircraft.

18. A system for creating a maintenance release (MR) record containing status information for a mobile platform, the system comprising:

a user input for a first quantity of release information pertaining to operating information concerning said mobile platform;

a electronically accessible database system including at least one database on board the mobile platform and at least one database off-board the mobile platform, for storing operational items relating to at least one of;

open faults; and deferrals for operational items that relate to mobile platform operational worthiness;

a display for displaying selected ones of said operational items to said user; and a server for running an electronic log book (ELB) application, the ELB application configured to perform a synchronization check of said database system to verify that said selected ones of said operational items obtained from any one of said databases of said database system represent most recently stored information in said database.

19. The system of claim 18, wherein said mobile platform includes a wireless communications system for communicating with said at least one off-board database of said database system.

20. The system of claim 18, wherein said display is used to display to said user a plurality of items including:

release information on operation of the mobile platform;

restrictions on operation of the mobile platform;

information on whether re-check maintenance items for said mobile platform are complete;

information pertaining to servicing of said mobile platform; information pertaining to active maintenance deferrals of maintenance items pertaining to said mobile platform;

information pertaining to closed technical and non-technical faults of equipment being carried by said mobile platform;

information pertaining to maintenance closing actions for said mobile platform; and information on recheck actions for said mobile platform.

* * * * *